United States Patent
Vaughan

(10) Patent No.: US 11,900,645 B2
(45) Date of Patent: Feb. 13, 2024

(54) SYSTEMS AND METHODS FOR MODELING AND CONTROLLING PHYSICAL DYNAMICAL SYSTEMS USING ARTIFICIAL INTELLIGENCE

(71) Applicant: DAUNTLESS.IO, INC., Walnut, CA (US)

(72) Inventor: Adam Vaughan, Walnut, CA (US)

(73) Assignee: DAUNTLESS.IO, INC., Walnut, CA (US)

( * ) Notice: Subject to any disclaimer, the term of this patent is extended or adjusted under 35 U.S.C. 154(b) by 0 days.

(21) Appl. No.: 17/987,275

(22) Filed: Nov. 15, 2022

(65) Prior Publication Data

US 2023/0252754 A1 Aug. 10, 2023

Related U.S. Application Data

(63) Continuation of application No. 17/176,217, filed on Feb. 16, 2021, now Pat. No. 11,544,930, which is a
(Continued)

(51) Int. Cl.
*G06V 10/20* (2022.01)
*G06T 7/13* (2017.01)
(Continued)

(52) U.S. Cl.
CPC .......... *G06V 10/255* (2022.01); *G06T 7/0004* (2013.01); *G06T 7/13* (2017.01);
(Continued)

(58) Field of Classification Search
CPC ...... G06V 10/255; G06V 10/25; G06V 20/52; G06V 20/46; G06V 10/82; G06V 20/44;
(Continued)

(56) References Cited

U.S. PATENT DOCUMENTS

| 5,777,901 A | 7/1998 | Berezin et al. |
| 7,760,238 B2 | 7/2010 | Giesen |

(Continued)

FOREIGN PATENT DOCUMENTS

WO WO-2020037127 A1 2/2020

OTHER PUBLICATIONS

EP19850451 Extended European Search Report dated Apr. 8, 2022.
(Continued)

*Primary Examiner* — Pinalben Patel
(74) *Attorney, Agent, or Firm* — Wilson Sonsini Goodrich & Rosati

(57) ABSTRACT

The present disclosure provides systems, methods, and computer program products for controlling an object. An example method can comprise (a) obtaining video data of the object and (b) performing motion analysis on the video data to generate modified video data. The method can further comprise (c) using artificial intelligence (AI) to identify a set of features in the modified video data. The set of features may be indicative of a predicted state of the object. The AI may be been trained offline on historical training data. The method can further comprise (d) using the predicted state to determine a control signal and (e) transmitting, in real-time, the control signal to the object to adjust or maintain a state of the object in relation to the predicted state. Operations (a) to (d) can be performed without contacting the object.

40 Claims, 7 Drawing Sheets

Related U.S. Application Data continuation of application No. PCT/US2019/046659, filed on Aug. 15, 2019.

(60) Provisional application No. 62/719,296, filed on Aug. 17, 2018.

(51) Int. Cl.
  *G06T 7/90* (2017.01)
  *G06T 7/00* (2017.01)
  *G06V 20/40* (2022.01)
  *G06V 10/82* (2022.01)
  *G06V 20/52* (2022.01)
  *G06V 10/25* (2022.01)

(52) U.S. Cl.
  CPC ............... *G06T 7/90* (2017.01); *G06V 10/25* (2022.01); *G06V 10/82* (2022.01); *G06V 20/44* (2022.01); *G06V 20/46* (2022.01); *G06V 20/52* (2022.01); *G06T 2207/10016* (2013.01); *G06T 2207/20081* (2013.01); *G06T 2207/20182* (2013.01)

(58) Field of Classification Search
  CPC ........... G06T 7/13; G06T 7/90; G06T 7/0004; G06T 2207/10016; G06T 2207/20081; G06T 2207/20182
  See application file for complete search history.

(56) References Cited

U.S. PATENT DOCUMENTS

| | | |
|---|---|---|
| 7,991,193 B2 | 8/2011 | Hampapur et al. |
| 8,253,770 B2 | 8/2012 | Kurtz et al. |
| 9,446,523 B2 | 9/2016 | Linnell |
| 9,993,169 B2 | 6/2018 | Kotanko et al. |
| 10,002,029 B1 | 6/2018 | Bequet et al. |
| 10,380,745 B2 | 8/2019 | Buyukozturk et al. |
| 10,530,991 B2 | 1/2020 | Wang et al. |
| 11,544,930 B2 | 1/2023 | Vaughan |
| 2006/0190419 A1 | 8/2006 | Bunn et al. |
| 2008/0298571 A1 | 12/2008 | Kurtz et al. |
| 2010/0027892 A1 | 2/2010 | Guan et al. |
| 2015/0304634 A1 | 10/2015 | Karvounis |
| 2016/0189397 A1 | 6/2016 | Mullins et al. |
| 2016/0300341 A1 | 10/2016 | Hay et al. |
| 2017/0334066 A1 | 11/2017 | Levine et al. |
| 2020/0410297 A1* | 12/2020 | Willers ............... G06N 3/045 |
| 2022/0092415 A1* | 3/2022 | Qiu .................... G06V 10/751 |

OTHER PUBLICATIONS

Marscher, William, et al. Video motion amplification vs. Operating deflection shapes for machinery diagnosis. Proc. Mfpt 2018—intelligent technologies for equipment and human performance monitoring. (2018): pp. 267-273.

PCT International Search Report and Written Opinion, PCT Application No. PCT/US2019/046659, dated Dec. 13, 2019, 21 pages.

Sarrafi, Aral et al. Vibration-based damage detection in wind turbine blades using Phase-based Motion Estimation and motion magnification. Journal of Sound and Vibration. vol. 421 (2018): pp. 300-318.

U.S. Appl. No. 17/176,217 Notice of Allowance dated Oct. 12, 2022.

U.S. Appl. No. 17/176,217 Office Action dated Jun. 23, 2022.

Vaughan, et al. Real-time, adaptive machine learning for non-stationary, near chaotic gasoline engine combustion time series. Neural networks: the official journal of the International Neural Network Society vol. 70 (2015): 18-26. doi:10.1016/j.neunet.2015.04.007.

Wadhwa, et al. Phase-based video motion processing. ACM Transactions on Graphics vol. 32 Issue 4 Jul. 2013 Article No. 80 pp. 1-10 https://doi.org/10.1145/2461912.2461966 .

Wu, Hao-Yu e al. Eulerian video 7 magnification for revealing subtle changes in the world. ACM Transactions on Graphics. vol. 31(4) (2012): 1-8.

Zhang et al. Video Acceleration Magnification. 2017 IEEE Conference on Computer Vision and Pattern Recognition (CVPR) (2017): 502-510.

\* cited by examiner

SYSTEMS AND METHODS FOR MODELING AND CONTROLLING PHYSICAL DYNAMICAL SYSTEMS USING ARTIFICIAL INTELLIGENCE

CROSS-REFERENCE

This application is a continuation of U.S. application Ser. No. 17/176,217, filed Feb. 16, 2021, (now U.S. Pat. No. 11,544,930, issued Jan. 3, 2023), which is a continuation of International Application No. PCT/US2019/046659, filed Aug. 15, 2019, which claims the benefit of U.S. application Ser. No. 62/719,296, filed Aug. 17, 2018, each of which is incorporated by reference herein in its entirety.

BACKGROUND

Anomaly detection and predictive maintenance systems may rely on data collected by sensors that are directly connected to the objects that the systems monitor. The sensors may include accelerometers, gyroscopes, microphones, strain gauges, thermometers, and the like. The sensors may transmit data to one or more computing devices over a wired network. The computing devices may process the data using artificial intelligence (AI) or machine learning (ML) algorithms to generate outputs, classifications, predictions, and control signals. The AI and ML algorithms may appear to be "black box" algorithms in that they offer little insight into what they "see" in the data when they process it.

SUMMARY

The present disclosure provides systems, methods, and computer program products for determining one or more characteristics of an object, predicting a future state of the object, and controlling the object, all without contacting it. A system as described herein may include a camera and one or more appropriately programmed computing devices in one or more locations. The camera may be configured to capture video of an object, e.g., a physical dynamical system. A dynamical system may be a rule for time evolution on a state space. Physical dynamical systems may be physical embodiments of such dynamical systems, e.g., the clock pendulum, the water and pipe, and the fish and lake. Dynamical systems may be defined by differential or difference equations in continuous or discrete time. Dynamical systems may be linear, nonlinear, nonstationary, deterministic, stochastic, random, and/or chaotic.

One example of a physical dynamical system is an internal combustion engine. The inputs to an engine may be fuel and air, and the output of the engine may be mechanical work. The time-varying state of the engine may be defined by parameters such as its temperature and internal pressure, the velocity or acceleration of its pistons, its frequency of vibration, or its stress or strain profile during operation, for example. These parameters may be modeled by a dynamical system.

The one or more computing devices can obtain video data of the object from the camera and perform motion analysis or other types of analysis (e.g., color analysis) on the video data to generate modified video data. Performing motion analysis on the video data may involve identifying, amplifying, or otherwise modifying motion that is detected in the video data. For example, the system can output modified video data in which vibrations of the above-mentioned internal combustion engine are amplified or otherwise exaggerated. Amplifying the vibrations may make them more perceptible to both (i) humans and (ii) algorithms that further process the modified video data.

The one or more computing devices can then use an artificial intelligence (AI) or machine learning (ML) algorithm to process the modified video data to identify a characteristic or current state of the object, predict a future state of the object, or control the object. For example, the system can use AI to process the modified video data of the above-mentioned internal combustion engine to classify the engine's predicted state as optimal or suboptimal. In the case of a suboptimal classification, the AI can generate a control signal in an attempt to correct the predicted state of the engine. For example, the AI can generate a control signal that adjusts the position of a valve in the engine in an attempt to achieve a different air-fuel ratio.

In some cases, the AI may be adaptively retrained in real-time, e.g., during operation or active use, to optimize its performance. Retraining the AI may involve using a weighted mix of historical, offline training data and adaptive, online training data to optimize the parameters of the algorithms.

The systems provided in the present disclosure can monitor physical dynamical systems without contacting such physical dynamical systems. This may be desirable for several reasons. First, sensors in direct contact with a physical dynamical system may tend to break or become disconnected from the physical dynamical system during operation, e.g. in a harsh environment. In contrast, the camera provided in the present disclosure may be physically separate from the physical dynamical system and may not be affected by its operation. Second, the use of a remotely-positioned camera may reduce the expense and/or weight of outfitting the physical dynamical system with sensors and wires. Third, the camera may provide a higher fidelity view of the system dynamics vs. lower fidelity point sensor measurements. Fourth, the camera provides an airgap that may lessen the security risk from third-party hacking of the physical dynamical system, e.g., in an Internet of Things implementation.

The systems provided in the present disclosure can also make more accurate predictions about the future state of a physical dynamical system by combining motion analysis with adaptively-retrained AI. In particular, the use of motion analysis as a pre-processing tool may allow subsequent AI to operate on higher resolution data. Moreover, the AI can transfer generalized learning based on historical training data to a new experimental apparatus with very little online training data. Together, motion analysis (or color analysis) and the AI may facilitate ultrafast prediction and control of nonlinear, nonstationary, stochastic, and/or chaotic physical dynamical systems. Such physical dynamical systems may be difficult to sense, model, and/or control with non-AI techniques.

The present disclosure additionally provides systems, methods, and computer program products for explaining what AI "sees." A system as described herein may include a camera; one or more appropriately programmed processing devices in one or more locations; and a user device having a user interface. The camera may be configured to capture video of an object. The one or more processing devices can use AI to process the video to generate an output identifying a characteristic of the object. The output may be, for example, a prediction that the object has or is experiencing an anomaly. The one or more processing devices can also generate an augmented derivative of the video. The augmented derivative of the video may be, for example, a version of the video in which imperceptible movements are amplified.

Thereafter, the user device can cause the user interface to display the output, the video, and the augmented derivative of the video. Displaying the output, the video, and the augmented derivative of the video in the same user interface for a user to view simultaneously may offer the user insight into what the AI "sees" when performing anomaly detection, state prediction, and control. The original, un-augmented video may in some cases appear to show that the object is operating as expected. However, the augmented derivative of the video may paint a different picture. Presenting the output, the video, and the augmented derivative of the video together can allow the user to more easily visualize the variations in the data that led the AI to detect an anomaly in object, for example.

In an aspect, the present disclosure provides a method for controlling an object. The method can comprise (a) obtaining video data of the object; (b) performing motion analysis on the video data to generate modified video data; and (c) using artificial intelligence (AI) to identify a set of features in the modified video data. The set of features may be indicative of a predicted state of the object. The AI can be trained offline on historical training data. The method can further comprise using the predicted state to determine a control signal; and (e) transmitting, in real-time, the control signal to the object to adjust or maintain a state of the object in relation to the predicted state. Operations (a) to (d) can be performed without contacting the object.

In some implementations, the method can further comprise adaptively retraining the AI in real time. The adaptive retraining can comprise adjusting one or more parameters of the AI using a weighted least squares method. The adaptive retraining can alternatively comprise adjusting one or more parameters of the AI using a supervised learning process. The adaptive retraining can comprise using a weighted mixture of the historical training data and adaptive, online training data.

In some implementations, operation (b) can comprise amplifying the video. Amplifying the video data can comprise processing the video data using one or more of video acceleration magnification or Eulerian video magnification.

In some implementations, operation (b) can comprise processing the video data using a phase-based motion estimation algorithm or an object edge tracking algorithm. In some other implementations, operation (b) can comprise selectively filtering one or more frequencies in the video data. In some other implementations, operation (b) can comprise decomposing the video data into a plurality of different spatial scales and orientations and processing each of the plurality of different spatial scales and orientations using a different computer vision or machine learning algorithm. Processing each of the plurality of different spatial scales and orientations using a different computer vision or machine learning algorithm can comprise semantically segmenting the plurality of different spatial scale and orientations. In some other implementations, operation (b) can comprise identifying a region of interest in the video data and performing temporal analysis on the region of interest.

In some implementations, the object can comprise a physical dynamical system or a simulation of the physical dynamical system. The control signal can be configured to cause the physical dynamical system or the simulation of the physical dynamical system to perform an action. The control signal can be configured to cause the physical dynamical system or the simulation of the physical dynamical system to shut down. The control signal can be configured to cause the physical dynamical system or the simulation of the physical dynamical system to continue operation.

In some implementations, the method can further comprise transmitting, in real-time, an alert or status indicator that indicates that the object is predicted to have the predicted state.

In some implementations, the set of features can comprise spatial or temporal features of the object. The spatial or temporal features can comprise vibrations or movements of the object. The vibrations or movements may be imperceptible to the naked eye. The spatial or temporal features can comprise color changes of the object.

In some implementations, the object can be a wind turbine, a nuclear reactor, a chemical reactor, an internal combustion engine, a semiconductor fabrication system, an airfoil, a plasma system, a biological system, a medical imaging system, or a data source for a financial trading system.

In some implementations, the AI can be a deep neural network, a reservoir computing algorithm, a reinforcement learning algorithm, or a generative adversarial network.

In some implementations, the historical training data can comprise video data of the object or video data of objects of the same type as the object.

In some implementations, the method can further comprise, prior to operation (b), obtaining data from non-camera sensors and using the AI to process both the data from the non-camera sensors and the modified video data to identify the set of features.

In some implementations, the predicted state can be an anomaly. The anomaly can be a defect. The defect can be a structural defect.

In some implementations, the method can further comprise, prior to operation (d), determining whether the predicted state of the object is suboptimal.

Another aspect of the present disclosure provides a method for processing video of an object to identify a characteristic of the object. The method can comprise (a) obtaining the video of the object; (b) using artificial intelligence (AI) to process the video to generate an output identifying the characteristic of the object; and (c) presenting the output and an augmented derivative of the video on a user interface of an electronic device of a user. The augmented derivative of the video can be generated upon augmenting one or more features of the video.

In some implementations, the method can further comprise presenting the video on the user interface.

In some implementations, augmenting the one or more features of the video can comprise amplifying movements or vibrations of the object in the video.

In some implementations, the characteristic of the object can be an anomaly.

In some implementations, the output can comprise a prediction or a classification about the object.

In some implementations, the method can further comprise enabling the user to perform an action through the user interface if the output is indicative of a suboptimal future state of the object. In some implementations, the method can further comprise obtaining additional video of the object; using the AI to process the additional video to generate an additional output about the object; and presenting the additional output and an augmented derivative of the additional video on the user interface.

In some implementations, the presenting can comprise the use of augmented reality.

In some implementations, the characteristic of the object can comprise a spatial or temporal feature of the object. The spatial or temporal feature can comprise a vibration or movement of the object. The vibration or movement may be imperceptible to the naked eye. The spatial or temporal feature can comprise a color change of the object.

Another aspect of the present disclosure provides a method that can comprise: (a) obtaining video data of an object; (b) processing the video data using a computer vision or machine learning algorithm to identify a plurality of characteristics of the object; (c) for each of the plurality of characteristics of the object, storing data defining the characteristic and an identifier of the video data in which the characteristic occurs in a database in association with a semantic descriptor of the characteristic; and (d) providing a search interface for the database. The search interface can be configured to enable a user to query the database using at least the semantic descriptors of the characteristics to access the video data.

In some implementations, the plurality of characteristics can comprise a frequency of vibration of the object, a color change of the object, or a classification of the object.

Another aspect of the present disclosure provides a method for identifying a characteristic of a physical dynamical system without contacting the physical dynamical system. The method can comprise (a) obtaining video data of the physical dynamical system; (b) performing motion analysis on the video data to generate modified video data; and (c) processing the modified video data using artificial intelligence (AI) to identify the characteristic of the physical dynamical system. The AI can be been trained offline on historical training data.

In some implementations, the characteristic of the physical dynamical system can be a current state of the physical dynamical system. In some implementations, the method can further comprise using the AI to determine a predicted state of the physical dynamical system based at least in part on the current state of the physical dynamical system. In some implementations, the method can further comprise: (d) using the predicted state to determine a control signal; and (e) transmitting, in real-time, the control signal to the object to adjust or maintain a state of the object in relation to the predicted state. The AI can be an end-to-end reinforcement learning algorithm.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein. Such a system can further comprise a low-latency camera for obtaining the video data of the object. The one or more computer processors in the system can comprise graphics processing units, application—specific integrated circuits, or general-purpose processors. The one or more computer processors can be edge computing devices or cloud computing devices.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "artificial intelligence" (AI), as used herein, generally refers to machine intelligence that includes a computer model or algorithm that may be used to provide actionable insight, make a prediction, and/or control actuators. The AI may be a machine learning algorithm. The machine learning algorithm may be a trained machine learning algorithm, e.g. a machine learning algorithm trained from sensor data. Such a trained machine learning algorithm may be trained using supervised, semi-supervised, or unsupervised learning process. Examples of machine learning algorithms include neural networks, support vector machines and reinforcement learning algorithms.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Figure 1:
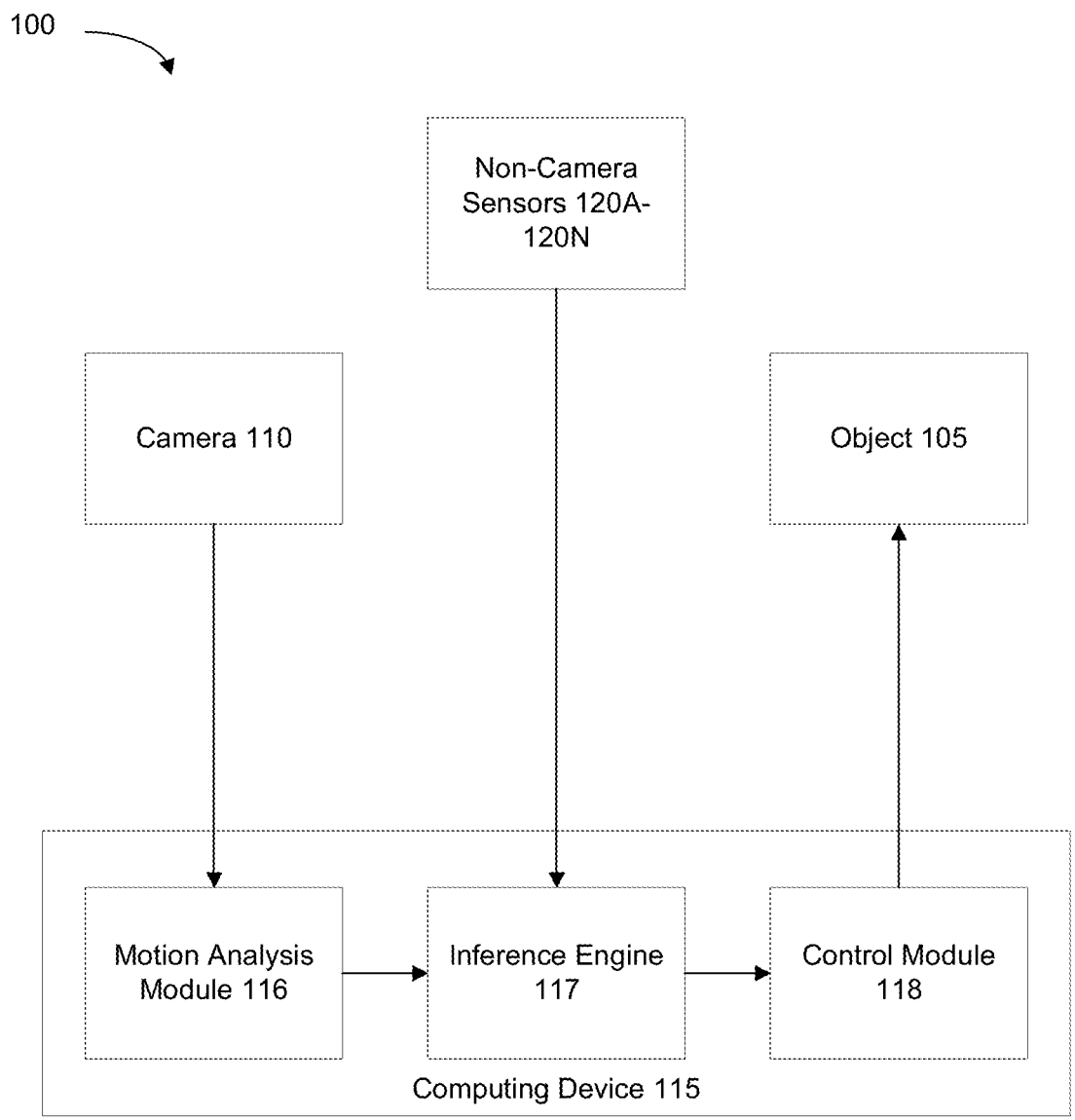
FIG. 1 schematically illustrates an anomaly detection system.

FIG. 1 schematically illustrates an anomaly detection system 100. The system 100 can detect anomalies in an object 105 and control or perform predictive maintenance on the object 105 without contacting the object 105. The object 105 may be a physical dynamical system or a simulation of a physical dynamical system. A physical dynamical system may be a physical embodiment of a dynamical system. A dynamical system may be a rule for time evolution on a state space. For example, a physical dynamical system may be an airplane wing, which may be described by a mathematical function that defines the time dependence of one or more positions on the wing in the air, e.g., due to vibrations of the airplane wing. A simulation of a physical dynamical system may be a computer model that represents the structure and function of the physical dynamical system.

The object 105 may be an energy production or distribution system, e.g., a steam generator, a hydroelectric generator, a nuclear reactor, a wind turbine, a solar panel, power distribution lines, or like. The object 105 may be a natural gas well, a natural gas refinery, pump, compressor, or a pipeline. The object 105 may be a battery or a fuel cell. The object 105 may be a chemical reactor. The object 105 may be a microfluidics system. The object 105 may be a biological system, e.g., a cell culture, a plant, an animal, a human, or the like. The object 105 may be a semiconductor fabrication system, e.g., a photolithography system, an etching system, or a deposition system. The object 105 may be a manufacturing system. The object 105 may be a robotics system. The object 105 may be a vehicle or a component of a vehicle, e.g., a rocket, an airplane or airfoil, a ship or sail, a train, an automobile, an internal combustion engine, an electric motor, or the like. The object 105 may be infrastructure, e.g., a building, a road, a bridge, a tunnel, a railroad, or the like. The object 105 may be a plasma system, e.g., a pulsed plasma system or nuclear fusion plasma system. The object 105 may be a light source. The object 105 may be a data source for a financial trading system, an emotional state detection system (e.g., lie detection system), or a security system.

The system 100 may have a camera 110. The camera 110 may have optical elements, including a shutter, a lens, mirrors, filters, and an image sensor. The camera 110 may be configured to capture video or images of the object 105. The camera 110 can generate two-dimensional (2-D) color or grayscale video or images of three-dimensional (3-D) scenes by projecting the 3-D scenes onto 2-D image planes. Accordingly, each point in a 2-D image may correspond to a 3-D spatial coordinate in a scene.

The camera 110 may be a digital camera. The camera 110 may be a dedicated device, or it may be integrated into a computing device such as a mobile device, electronic tablet, personal computer, or the like. The camera 110 may be a low-latency camera. The camera may be a high-frame-rate camera, e.g., a camera that captures video at a rate of at least about 100 frames per second (FPS), 200 FPS, 300 FPS, 400 FPS, 500 FPS, 1,000 FPS, 5,000 FPS, 10,000 FPS, 50,000 FPS, 100,000 FPS, or more. In some cases, the camera 110 may be a 360-degree camera.

The camera 110 may be substituted, in some circumstances, with a different type of imaging device. For example, the camera 110 may be substituted for an infrared camera, a radar system (e.g., a traditional radar system or a Synthetic Aperture Radar system), a magnetic imaging system, a light detection and ranging system, a telescope, a medical resonant imaging (MRI) scanner, a computer tomography (CT) scanner, or the like. Although this disclosure generally refers to "video data," the systems and methods described herein can also use data from these other types of imaging devices and/or a combination of imaging devices.

The system 100 may have a computing device 115. The computing device 115 can obtain video data from the camera 110 and process the video data to generate an output.

The computing device 115 may have a motion analysis module 116. The motion analysis module 116 can process the video data from the camera 115 to generate modified video data. In particular, the motion analysis module 116 can process the video data to identify, amplify, or otherwise modify motion detected in the video. For example, the motion analysis module 116 can generate modified video data in which vibrations of the object are exaggerated or otherwise amplified. The motion analysis module 115 may be robust to changes in lighting and to noise (e.g., errant objects entering the receptive field of the camera).

The computing device 115 may also have an inference engine 117. The inference engine 117 can generate an output using video data from the camera 110 or modified video data from the motion analysis module 116. The output may be one or more characteristics of the object. The one or more characteristics of the object may define a current state of the object. The one or more characteristics of the object may be parameters or variables that describe the object, e.g., a velocity, acceleration, frequency of vibration, stress, strain, color, or temperature the object. Alternatively or additionally, the output may be a prediction of a future state of the object. Alternatively or additionally, the output may be a determination about whether the predicted state of the object is sub-optimal. The inference engine 117 may be an AI accelerator that is configured to run AI, ML, or computer vision algorithms. The inference engine 117 may be configured to retrain such algorithms online in real-time.

The computing device 115 may also have a control module 118. The control module 118 can receive as input the output from the inference engine 117 and, in response, generate and transmit a control signal to the object to control its operation. The control signal may be configured to adjust or maintain a state of the object in relation to a predicted state of the object. That is, the control signal may be configured to adjust operational parameters of the object to move the object's state away from the predicted state, e.g., if the predicted state is suboptimal. Or the control signal may be configured to maintain the operational parameters of the object to keep the object close to the predicted state, e.g., if the predicted state is optimal or otherwise satisfactory.

The motion analysis module 116, the inference engine 117, and the control module 118 may be implemented in hardware, software, or both. In some implementations, the motion analysis module 116, the inference engine 117, and the control module 118 may be implemented as a single, end-to-end AI or ML algorithm.

The computing device 115 may be a mobile device, an electronic tablet, a laptop or desktop computer, or the like. The computing device 115 may have a general-purpose processor, a graphics processing unit (GPU), an application-specific integrated circuit (ASIC), or a field-programmable gate-array (FPGA). The particular type of processor used in the computing device 115 may depend at least in part on how quickly control signals need to be transmitted to the object. For example, the computing device 115 may need to generate control signals for an internal combustion engine faster than for a robotics system.

The computing device 115 may be in close physical proximity to the camera 110 and the object 105. In such cases, the computing device 115 may be considered an edge computing device. In general, an edge computing device may be a computing device that is in close physical proximity to a data source or destination. In other implementations, the computing device 115 may be located remotely with respect to the object 105 and the camera 110. In such implementations, the computing device 115 can communicate with the camera 110 over a wired or wireless network, e.g., a fiber optic network, Ethernet® network, a satellite network, a cellular network, a Wi-Fi® network, a Bluetooth® network, or the like. In other implementations, the computing device 115 may be several distributed computing devices that are accessible through the Internet. Such computing devices may be considered cloud computing devices.

In some implementations, the system 100 may have one or more non-camera sensors 120A-120N. The inference engine 117 and the control module 118 can use data from the non-camera sensors 120A-120N in addition to the video data to ascertain the current state of the object, predict a future state of the object, determine whether the predicted state is suboptimal, and generate a control signal to alter the state of the object in relation to the predicted state of the object. The inference engine 117 and the control module 118 can use one or more sensor fusion techniques to combine the video data and the data from the non-camera sensors 120A-120N. Sensor fusion can involve synchronizing data from the various sensors over time. Alternatively or additionally, data from the non-camera sensors can be used to validate predictions made using the video data.

Figure 2:
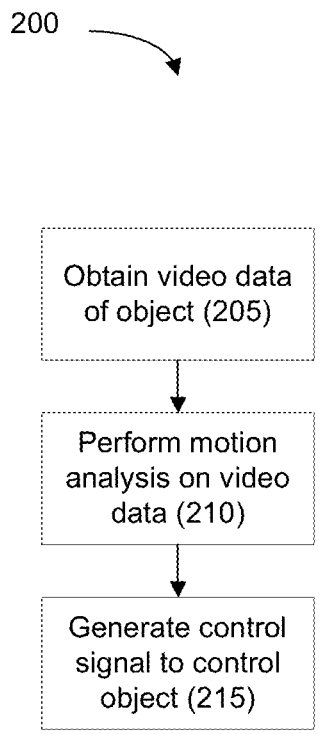
FIG. 2 is a flow chart of an example process for monitoring and controlling a physical dynamical system.

FIG. 2 is a flow chart of an example process 200 for monitoring and controlling a physical dynamical system. A system of one or more appropriately programmed computers in or more locations can perform the process 200. For example, the computing device 115 can perform the process 200.

A physical dynamical system may be a physical embodiment of a dynamical system. A dynamical system may be a rule for time evolution on a state space. One example of a physical dynamical system is a wind turbine. The input to a wind turbine may be current and previous wind speeds, and the output of the wind turbine may be the amount of electricity the wind turbine generates. The state of a wind turbine may be defined by parameters such as its velocity and acceleration of rotation, the forces on its blades, its yaw angle or angle of attack, its frequency of vibration, or even events from other upstream wind turbines, for example.

Other examples of physical dynamical systems are nuclear reactors, chemical reactors, internal combustion engines, semiconductor fabrication systems, airfoils, plasma systems, biological systems, medical imaging systems, and data sources for financial trading systems.

In some cases, the physical dynamical system may be a simulation of a physical dynamical system. A simulation of a physical dynamical system may be a computer model (e.g., a three-dimensional computer model) that represents the structure and function of the physical dynamical system. Simulations of physical dynamical systems can be made using general adversarial networks (GANs). A GAN can include a generative network and a discriminative network. The generative network can generate candidate simulations while the discriminatory network can evaluate the candidate simulations. The goal of the discriminatory network may be to distinguish between a simulation and a true data distribution, while the goal of the generative network may be to increase the error rate of the discriminatory network. Back-propagation can be applied to both networks so that the generative network produces better simulations, while the discriminative network becomes more skilled at flagging simulations.

In a first operation of the process 200, the system of one or more appropriately programmed computers can obtain video data of the physical dynamical system (205).

In a second operation, the system can perform motion analysis on the video data to generate modified video data (210). Performing motion analysis on the video data to generate modified video data can involve identifying, amplifying, or otherwise modifying motion that the system detects in the video data. For example, the system can generate modified video data in which vibrations of the physical dynamical system are amplified or otherwise exaggerated. Amplifying such vibrations can make the vibrations more perceptible to both humans and subsequent algorithms that process the modified video data.

The system can use any appropriate computer vision, ML, or AI algorithm to perform motion analysis on the video data to generate modified video data. Such algorithms may perform motion analysis on the video data by tracking intensity changes in pixels and/or filtering one or more (spatial or temporal) frequencies in the video data. More specifically, the algorithms may first identify and semantically label groups of pixels in the video data to identify regions of interest in the video data. For example, the system can identify a particular component of the physical dynamical system and assign a name to that component. This process may be referred to as "semantic segmentation." Next, the algorithms may decompose the video data into different spatial scales and orientations. Thereafter, the algorithms may temporally filter the regions of interest to identify movements or vibrations in the regions of interest. In some cases, a different algorithm can operate on each spatial scale and orientation in parallel. Each algorithm can examine the video data for a different feature. The following paragraphs will describe particular examples of motion analysis algorithms, including spatial analysis algorithms (e.g., semantic segmentation algorithms) and temporal analysis algorithms. Although these two types of algorithms are described separately, they may be combined to form a single, end-to-end, spatio-temporal analysis algorithm. For example, a temporal filter may be applied to a spatial analysis algorithm to form such an end-to-end algorithm.

One example of a spatial analysis algorithm is an object detection and tracking algorithm. An object detection and tracking algorithm can detect, identify, and track object edges in the video by identifying locations in the video where pixel intensity or color changes quickly. Such changes may be indicative of object edges. The object edges can be tracked over time by comparing pixels between frames of the video. In some cases, the system can instead use neural networks to detect, identify, and/or track objects. Neural networks can employ multiple layers of operations to predict one or more outputs from one or more inputs. Neural networks may include one or more hidden layers situated between an input layer and an output layer. The output of each layer may be used as input to another layer, e.g., the next hidden layer or the output layer.

Each layer of a neural network may specify one or more transformation operations to be performed on input to the layer. Such transformation operations may be referred to as neurons. The output of a particular neuron may be a weighted sum of the inputs to the neuron, adjusted with a bias and multiplied by an activation function, e.g., a rectified linear unit (ReLU) or a sigmoid function.

Training a neural network can involve providing labeled inputs (i.e., inputs with known outputs) to the neural network to generate predicted outputs, comparing the predicted outputs to the known outputs, and updating the algorithm's weights and biases to account for the difference between the predicted outputs and the known outputs. Specifically, a cost function may be used to calculate a difference between the predicted outputs and the known outputs. By computing the derivative of the cost function with respect to the weights and biases of the network, the weights and biases may be iteratively adjusted over multiple cycles to minimize the cost function. Training may be complete when the predicted outputs satisfy a convergence condition, such as obtaining a small magnitude of calculated cost.

Convolutional neural networks (CNNs) may be particularly adept at classifying objects in video. CNNs may be neural networks in which neurons in some layers—called convolutional layers—receive pixels from only a small portion of the video. Each neuron in such a convolutional layer may have the same weights. In this way, the convolutional layer can learn weights that allow the convolution layer to detect particular features, e.g., shapes or edges, in any portion of the image.

One example of a temporal analysis algorithm is an optical flow algorithm. An optical flow algorithm may estimate the motion of an object in a video by computing partial derivatives with respect to the spatial and temporal coordinates of the object, e.g., using Taylor series approximations. Lagrangian motion magnification algorithms may use such optical flow algorithms to estimate the velocity of an object defined by a group of pixels and then magnify the estimated velocity to generate amplified video.

Alternatively or additionally, the system can perform motion analysis using Eulerian video magnification. Eulerian video magnification algorithms can estimate and magnify subtle changes in video frames, e.g., changes in pixel intensity, at fixed image locations rather than matching pixels in different locations across multiple frames. Eulerian video magnification techniques can involve decomposing video frames spatially through band-pass filtering, i.e., to identify object edges or areas of interest, and temporally filtering the decomposed video frame to identify areas to be magnified.

Alternatively or additionally, the system can perform motion analysis using a video acceleration magnification algorithm. A video acceleration magnification algorithm can magnify the acceleration of an object in a video, as opposed to its linear motion. In some cases, the algorithm can magnify the video in the phase domain. Video acceleration magnification is described in more detail in Yichao Zhang et al., *Video Acceleration Magnification*, Apr. 22, 2017, available at https://arxiv.org/pdf/1704.04186.pdf, which is entirely incorporated herein by reference.

Alternatively or additionally, the system can perform phase-based motion estimation on the video. A phase-based motion estimation algorithm can compute the phase of the video over time at multiple spatial scales and orientations. Then, the algorithm can temporally bandpass these phases to isolate specific temporal frequencies relevant to a given application and remove any temporal DC component. These temporally band-passed phases may correspond to motion in different spatial scales and orientations. To synthesize magnified motion, the band-passed phases may be multiplied by an amplification factor a. The amplified phase differences may then be used to magnify or attenuate the motion in the sequence by modifying the phases of each coefficient by this amount for each frame.

After performing motion analysis on the video data to generate modified video data, the system can process the modified video data to generate a control signal to control the physical dynamical system (215). Processing the modified video data to generate a control signal to control the physical dynamical system can involve determining a current state of the physical dynamical system and predicting a future state of the physical dynamical system. Thereafter, the system can determine whether the predicted state is optimal or suboptimal and generate a control signal configured to alter or maintain the state of the physical dynamical system in relation to the predicted state.

The control signal may be configured to cause the physical dynamical system to perform a corrective action, e.g., if the system predicts that the future state of the physical dynamical system is suboptimal. Alternatively or additionally, the control signal may be configured to cause the physical dynamical system to shut down, e.g., if the system predicts that a catastrophic failure of the physical dynamical system is imminent. Alternatively or additionally, the control signal may be configured to cause the physical dynamical system to continue operation as is, e.g., if the system predicts that the future state of the physical dynamical system is normal. In some cases, the control signal may be a null signal.

Figure 3:
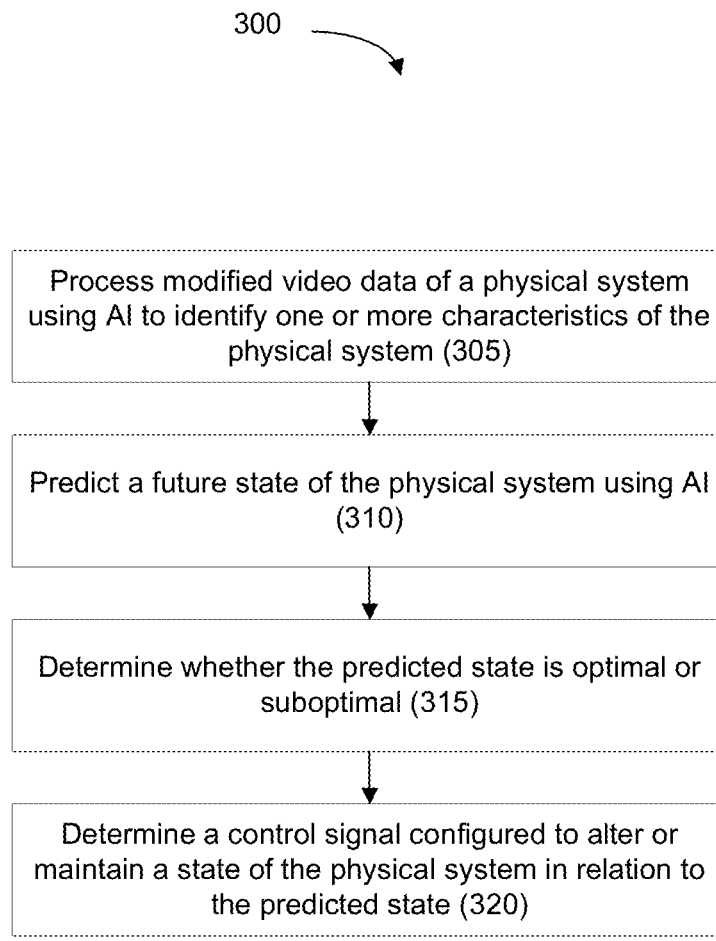
FIG. 3 is a flow chart of an example process for processing modified video data to generate a control signal to control a physical dynamical system.

FIG. 3 is a flow chart of an example process 300 for processing modified video data to generate a control signal to control a physical dynamical system. A system of one or more appropriately programmed computers in or more locations can perform the process 300. For example, the computing device 115 can perform the process 300.

In a first operation, the system can process the modified video data using AI to identify one or more characteristics of the physical dynamical system (305). The one or more characteristics may be a current state of the physical dynamical system. The current state may be a vector of parameters or variables that define the current state. The parameters or variables may include a temperature or color of the physical dynamical system, a speed or acceleration of the physical dynamical system, a stress or strain profile of the physical dynamical system, or a frequency of vibration of the physical dynamical system, for example.

In a second operation, the system can predict, using AI, a future state of the physical dynamical system based at least in part on the modified video data or a derivative thereof, e.g., the current state the physical dynamical system (310). The AI may be the same as or different than the AI used to identify the one or more characteristics of the physical dynamical system. That is, the two may be trained together or separately.

The predicted state of the physical dynamical system may be a binary classification. For example, the system can classify the predicted state as normal or abnormal. Alternatively, the system can predict one or more parameter or variables that define the predicted state. The system can output discrete values for those parameters or variables, or it can output probability distributions for those parameters or variables.

The predicted state of the physical dynamical system may be an anomaly. The anomaly may be a defect. The defect may be a structural defect (e.g., a fracture). The defect may be a failure to produce a desired product, e.g., to produce a desired chemical in a reactor.

Predicting the future state of the physical dynamical system may involve identifying a set of features indicative of the predicted state of the physical dynamical system in the modified video data. In some cases, the set of features may include spatial and/or temporal features. For example, the set of features may include a frequency of vibration of the physical dynamical system, movement of the physical dynamical system, acceleration of the physical dynamical system, a color change of the physical dynamical system (indicating a temperature change), or the like. In some cases, these changes may be imperceptible to the naked eye.

In some cases, the system can transmit, in real-time, an alert or status indicator about the current or predicted state of the physical dynamical system to a monitoring platform. The monitoring platform may be configured to enable a human operator to monitor and/or operate the physical dynamical system. For example, the monitoring platform may be configured to enable the human operator to intervene in the case of an imminent failure of the physical dynamical system.

After predicting the future state of the physical dynamical system, the system may determine whether the predicted state is optimal or suboptimal (315). The predicted state may be suboptimal, for example, if the physical dynamical system is not operating at at least about 70%, 75%, 80%, 85%, 90%, or 95% of its maximum efficiency, or higher. Alternatively, the predicted state may be suboptimal if the physical dynamical system is expected to experience a failure.

The system can then use AI to determine, generate, and transmit a control signal to the physical dynamical system that is configured to alter or maintain a state of the physical dynamical system in relation to the predicted state (320). That is, the control signal may be configured to cause the physical dynamical system to move closer to or away from the predicted state, or maintain its current state. The AI may be the same as or different than the AI used to identify the one or more characteristics of the physical dynamical system or predict the future state of the physical dynamical system. That is, the AI algorithms may be trained together, in an end-to-end fashion, or separately. The system can transmit the control signal to the physical dynamical system in real-time. That is, the system can transmit the control signal before the physical dynamical system reaches the predicted state. In this way, the system can prevent the physical dynamical system from reaching the predicted state if the predicted state is suboptimal.

The control signal can be configured to cause the physical dynamical system to perform a corrective action, e.g., to improve the operational efficiency of the physical dynamical system. Alternatively or additionally, the control signal can be configured to cause the physical dynamical system to shut down, e.g., if the system predicts that a catastrophic failure is imminent. Alternatively or additionally, the control signal can be configured to cause the physical dynamical system to continue operation, e.g., if the system predicts that the future state of the physical dynamical system is within a normal range. In some cases, the control signal may be a null signal.

In some implementations, the AI described herein can use non-camera data in addition to video data to determine a current state of the physical dynamical system, predict a future of the physical dynamical system, or generate a control signal. The AI may use one or more sensor fusion techniques to combine the video data and the data from the non-camera sensors. Sensor fusion can involve synchronizing data from the various sensors over time, e.g., with sensor data from an analog to digital converter, time series database, and/or Internet of Things API. Alternatively or additionally, data from the non-camera sensors can be used to validate predictions made using the video data. For example, the validated predictions can be used as training data to adaptively retrain the AI.

In some cases, the system can retrain any of the AI mentioned above in real-time (325). The system can retrain the AI using a supervised learning process. The training data for a supervised learning process may include past, present, and predicted states of the physical dynamical system. For example, to retrain the AI that is used to predict the future state of the physical dynamical system, the system can compare the predicted state of the physical dynamical system to the state that was actually observed and adjust the parameters of the AI accordingly, e.g., through backpropagation using gradient descent. As another example, to retrain the AI that is used to generate the control signals for the physical dynamical system, the system can similarly compare the intended effect of the control signals to their actual effect and adjust the parameters of the AI algorithm accordingly.

In some cases, the system can retrain only a portion of the AI, e.g., the last layer of a neural network. In such cases, backpropagation may not be required. To adjust the weights and biases of the last layer of the neural network, the system may use a weighted (recursive) least squares method. That is, the system may attempt to estimate the weights and biases by (recursively) minimizing a least squares cost function relating to the input signals. The (recursive) least squares method may be weighted in that certain input signals, e.g., input signals received more recently, may be weighted more heavily. Weighted recursive least squares is described in more detail in Adam Vaughan et al., *Real-time adaptive machine learning for non-stationary, near chaotic gasoline engine combustion time series*, NEURAL NETWORKS 70 (2015), which is entirely incorporated herein by reference.

In some cases, the system can retrain the AI using an unsupervised or semi-supervised learning process, e.g., by inferring labels for training data based on the operational state of the physical dynamical system.

Retraining the AI may involve using a weighted mix of historical, offline training data and adaptive, online training data.

The AI mentioned above can take several different forms. In some cases, the AI may be a deep neural network. Deep neural networks may classify a physical dynamical system's current state or predict the physical dynamical system's future state as being normal or abnormal, or optimal or suboptimal. Alternatively, the classification may have a finer resolution. For example, a deep neural network may classify a physical dynamical system's current state or predict the physical dynamical system's future state along a scale, or it may predict one or more parameters or variables that define the predicted state.

The deep neural networks may be CNNs or recurrent neural networks (RNNs). CNNs may be particularly adept at analyzing and classifying small motions in videos. CNNs may be neural networks in which neurons in some layers— called convolutional layers—receive pixels from only a small portion of the video. Each neuron in such a convolutional layer may have the same weights. In this way, the convolutional layer can learn weights that allow the convolution layer to detect particular features, e.g., shapes or edges, in any portion of the image.

RNNs may be particularly adept at analyzing time-series data. An RNN may include an input layer that is configured to receive a sequence of time-series inputs, e.g., a sequence of frames in a video. An RNN may also include one or more hidden recurrent layers that maintain a state. At each time step, each hidden recurrent layer may compute an output and a next state for the layer, where the next state may depend on the previous state and the current input. The state may be maintained across time steps and may capture dependencies in the input sequence. Such an RNN may be used to predict the future state of a physical dynamical system. One example of an RNN is a long short-term memory network (LSTM). An LSTM unit may be made of a cell, an input gate, an output gate and a forget gate. The cell may be responsible for keeping track of the dependencies between the elements in the input sequence. The input gate may control the extent to which a new value flows into the cell, the forget gate may control the extent to which a value remains in the cell, and the output gate may control the extent to which the value in the cell is used to compute the output activation of the LSTM unit. The activation function of the LSTM gate may be the logistic function.

In some cases, the AI described herein may be a reinforcement learning algorithm. Reinforcement learning algorithms may seek an optimal solution to a problem by balancing exploration of uncharted territory with exploitation of current knowledge. In reinforcement learning, labeled input-output pairs need not be used. Instead, an agent can choose an action from a set of available actions. The action may result in a new environment state. The change in state may have a reward associated with it, and the reward may be positive or negative depending on whether the new state is better or worse than the previous state. The goal of the agent may be to collect as much reward as possible, e.g., maximize a video game score in simulation.

The set of available actions from which the agent can choose may be a probability distribution of actions. The probability distribution may be adjusted as the agent receives rewards. That is, actions that result in negative rewards may be slowly filtered out of the probability distribution, while actions that result in positive rewards may be emphasized in the probability distribution. In the context of the anomaly detection and predictive maintenance algorithms described herein, the state may be the state of a physical dynamical system, and the reward function may reward the generation of control signals that maintain a normal state. The reinforcement learning algorithm (or AI in general) may be "end-to-end" in that it ascertains a current state of the physical dynamical system, predicts a future state, and generates an appropriate control signal using as part of a single, integrated process.

In some cases, the AI described herein may be a reservoir computing network. Reservoir computing networks may be viewed as an extension of neural networks. Typically an input signal may be fed into a fixed but random dynamical system called a reservoir, and the dynamics of the reservoir may map the input to a higher dimension. Then, a simple readout mechanism may be trained to read the state of the reservoir and map it to the desired output. One example of a reservoir computing network is a liquid state machine (LSM). An LSM may include a large number of neurons that receive a time-varying input (e.g., video data of a physical dynamical system), form an external source and other neurons. The neurons may be randomly connected to each other. The recurrent nature of the connections may turn the time-varying input into a spatio-temporal pattern of activations. The spatio-temporal pattern of activations may be read out by linear discriminant units. The soup of recurrently connected nodes may compute a large variety of nonlinear functions on the input.

In some cases, the AI described herein may be a transfer learning algorithm. A transfer learning algorithm may be trained to solve one problem and adapted to solve a different but related problem by tuning the parameters of the original algorithm.

The AI described herein may be trained using a supervised learning process. Specifically, the AI can be trained by providing historical, labeled video data of a physical dynamical system to the AI. The labels may indicate the state of the physical dynamical system at particular frames of the video data. Alternatively, the AI described herein may be trained using an unsupervised or semi-supervised learning process. Specifically, the AI can be trained by providing historical, unlabeled video data of a physical dynamical system to the AI. Thereafter, the AI may infer that particular frames of video data are indicative of abnormal states of the physical dynamical system because those frames are outliers as compared to other frames. These inferences may constitute labels for the video data. As described in more detail above, certain AI may alternatively be trained using a reinforcement learning process.

Figure 4:
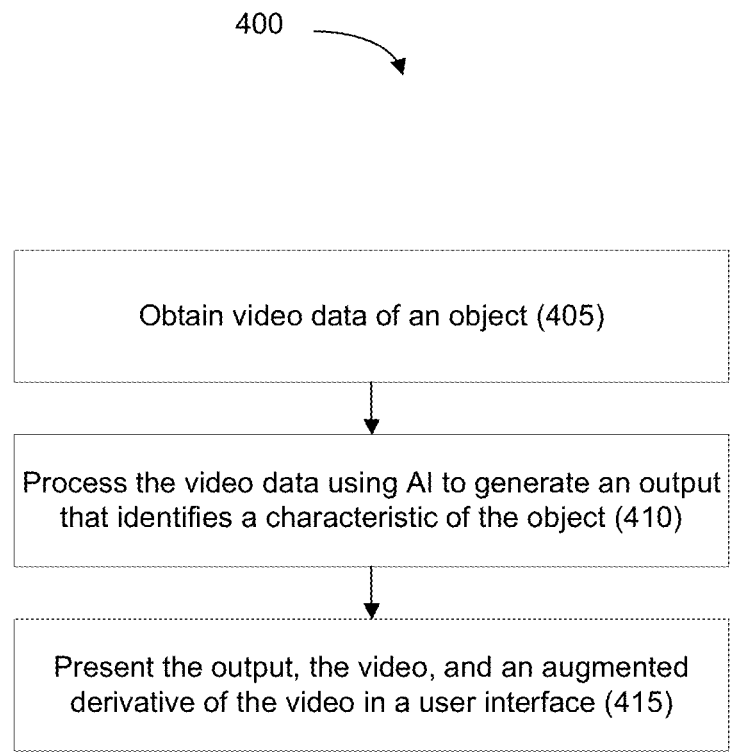
FIG. 4 is a flow chart of an example process for explaining what AI "sees."

FIG. 4 is a flow chart of an example process 400 for explaining what AI "sees." The process 400 can be performed by a system of one or more computers in one or more locations.

The system can obtain video of an object (405). The system can process the video using AI to generate an output that identifies a characteristic of the object (410). The AI can be, for example, any of the AI or ML algorithms described in this disclosure.

The characteristic of the object may be a current state of the object, e.g., a set of parameters, variables, or features that describe the object. For example, the characteristic of the object may be a spatial or temporal feature of the object. The spatial or temporal feature may be a change in color of the object, or it may be a vibration or a movement of the object. In some cases, the vibration or movement may be imperceptible to the naked eye. The characteristic may be an anomaly in the object. The anomaly may be a defect. The defect may be a structural defect. In some cases, the characteristic of the object may be a prediction or a classification about a future state of the object.

The system can present the output, the video, and an augmented derivative of the video on a user interface of an electronic device of a user (415). In some cases, the system may present only the output and augmented derivative of the video.

The augmented derivative of the video can be generated upon augmenting one or more features of the video. Augmenting the one or more features of the video can include, for example, amplifying vibrations or movements of the object in the video. Augmenting the one or more features of the video can alternatively or additionally include amplifying a change in color of the object, identifying or classifying a structural feature of the object, or removing noise from the video. The system can generate the augmented derivative of the video using an of the motion analysis techniques described in reference to FIG. 2.

In some cases, the user interface may be a virtual reality interface, and the system may overlay the augmented derivative of the video on what the user sees in real life.

Presenting the output, the video, and the augmented derivative of the video in the same user interface for a user to view simultaneously may offer the user insight into what the AI "sees" when performing anomaly detection, prediction, and/or control. The original, un-augmented video may in some cases appear to show that the object is operating as expected. However, the augmented derivative of the video may paint a different picture. For example, an augmented derivative of a video of an airplane wing may show that it is actually vibrating quite violently. While the AI may be able to detect these vibrations using trained, finely-tuned parameters, the vibrations may be imperceptible to the naked eye. Presenting the output, the video, and the augmented derivative of the video together can allow the user to more easily visualize the variations in the data that led the AI to detect an anomaly, for example. As such, the process 400 may be a valuable AI tool, known colloquially as "Explainable AI" or "Interpretable AI."

The user interface can optionally enable the user to perform a corrective action if the output is indicative, for example, of an anomaly in the object or the object having a suboptimal future state. If the user does perform a corrective action, the process 400 may be repeated to show an improvement in the state of the object. This may further improve a user's understanding of how the AI or the dynamical system itself works.

Figure 5:
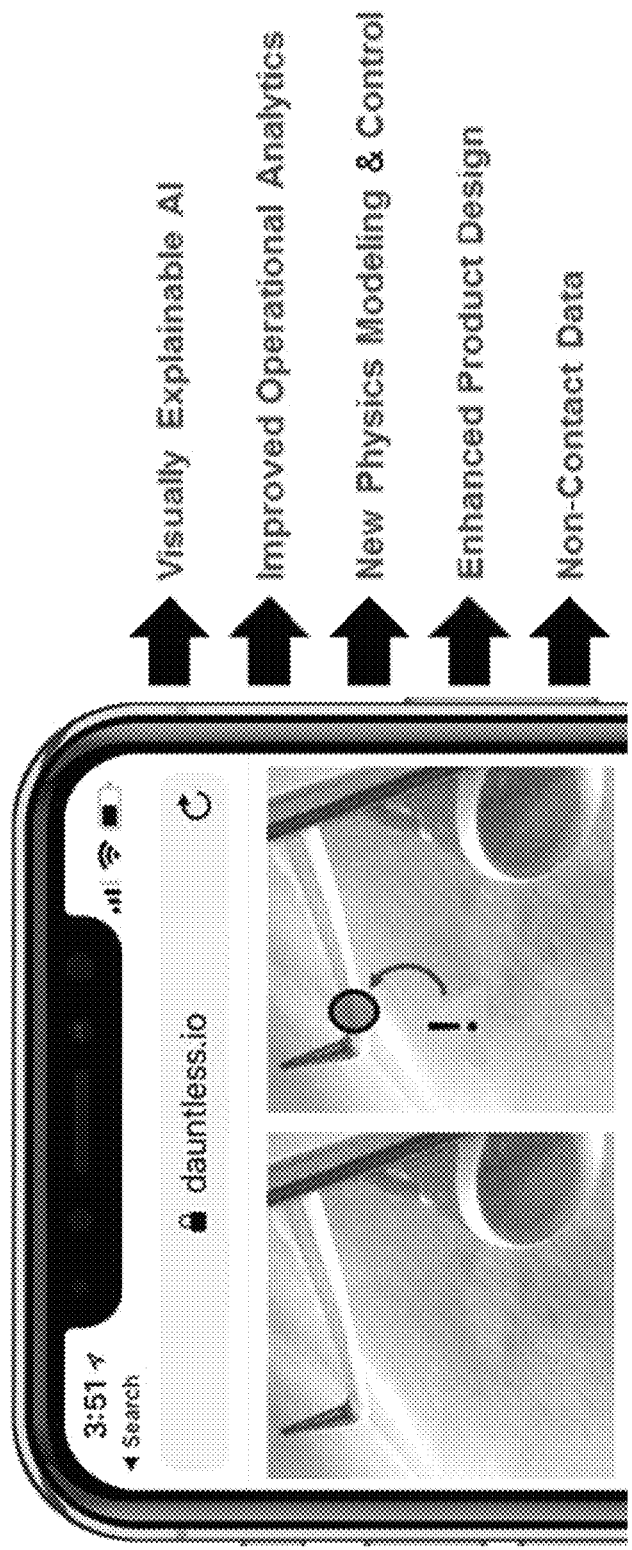
FIG. 5 shows an example of an "Explainable AI" user interface.

FIG. 5 shows an example of an "Explainable AI" user interface. The left window of the user interface may show a video of an airplane wing. The right window of the user interface may show a modified version of the video of the airplane wing. For example, the right window may show a version of the video in which vibrations of the airplane wing are amplified so that they are perceptible to a user. The right window may also show an output. In some cases, the output may be a warning sign that indicates that the vibrations are abnormal. Alternatively or additionally, the output may indicate where on the airplane wing a structural defect exists. This user interface may help to explain to a user why an underlying ML or AI algorithm (e.g., a predictive maintenance algorithm) determined, for example, that the airplane should be grounded for safety reasons, or that the airplane wing should be redesigned. Without a clear demonstration of the amplified vibrations, the user may not understand, from an engineering perspective, why the airplane should be grounded. The amplified video can help to explain the problem that the underlying ML or AI algorithm "sees." In this way, the user interface may help the user make better operational decisions, faster.

Figure 6:
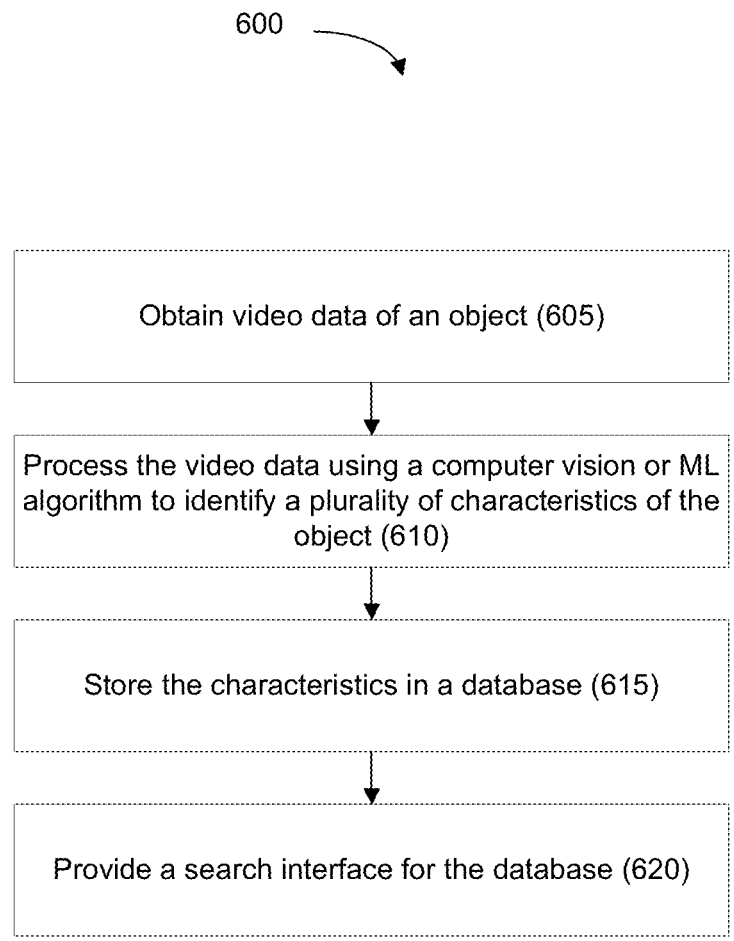
FIG. 6 is a flow chart of a process for providing a video search interface.

FIG. 6 is a flow chart of a process 600 for providing a search interface for a video database. The process 500 can be performed by one or more appropriately programmed computers in one or more locations.

The system can obtain video data of an object (605). The system can process the video data using a computer vision or machine learning algorithm to identify a plurality of characteristics of the object (610). The plurality of characteristics may be a frequency of vibration of the object, a color change of the object, or a classification of the object.

For each of the plurality of characteristics of the object, the system can store data defining the characteristic and an identifier of the video data in which the characteristic occurs in association with a semantic descriptor of the characteristic (615). For example, if a particular characteristic of the object is a frequency of vibration of the object, the system can store the frequency value and an identifier of the video, frame, and frame location in which the frequency value occurs in a database table called "frequency."

The system can provide a search interface for the database (620). The search interface may be configured to enable a user to query the database using at least the semantic descriptors of the characteristics to access the video data. For example, a query may specify (i) the term "frequency" and (ii) a range of frequencies. The database can return video frames, links to video frames, or identifiers of video frames that have those frequencies. Such a database may facilitate fast video searches. In some cases, the query may be an SQL-type query.

EXAMPLES

The systems and methods described herein can be used to control a wind turbine blade's angle of attack actuator based on potentially correlated turbulent blade motion observed in another wind turbine upstream in a wind farm. The systems and methods described herein can also be used to track the pressure or flexing of a structure that is being heated by a varying flame, or monitoring the flame itself. The systems and methods described herein can also monitor the line edge of an internal truss structure in a rocket as it flexes during launch instead of using load cells, strain gauges, or accelerometers to determine if the mission should abort.

Computer Systems

Figure 7:
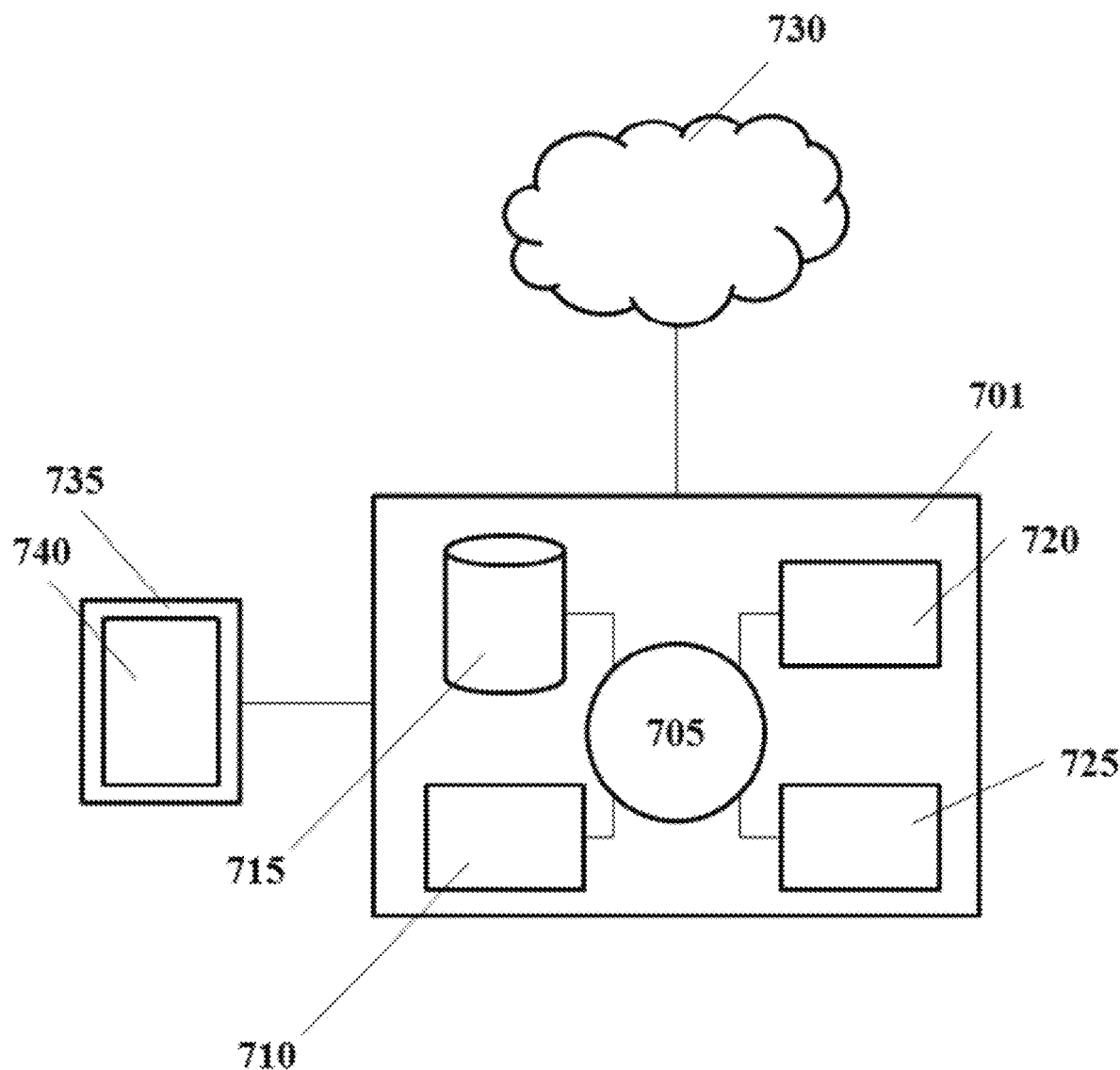
FIG. 7 shows a computer system that is programmed or otherwise configured to implement methods provided herein.

The present disclosure provides computer systems that are programmed to implement methods of the disclosure. FIG. 7 shows a computer system 701 that is programmed or otherwise configured to control a physical dynamical system, perform an Explainable AI process, or implement a video search interface. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, the Explainable or Interpretable AI interface or the video search interface. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, a motion analysis, computer vision, ML, or AI algorithm for modeling or controlling a physical dynamical system.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for controlling an object, comprising:
   (a) obtaining video data of said object;
   (b) performing motion analysis or color analysis on said video data to generate modified video data;
   (c) applying an artificial intelligence (AI) algorithm to said modified video data, to identify a set of features in said modified video data, wherein said set of features is indicative of a predicted state of said object;
   (d) using said predicted state to determine a control signal; and
   (e) transmitting said control signal to adjust or maintain a state of said object in relation to said predicted state, wherein (a)-(d) are performed without contacting said object.

2. The method of claim 1, wherein at least a portion of (a)-(e) is performed in real time.

3. The method of claim 2, further comprising adaptively adjusting at least a portion of said AI algorithm.

4. The method of claim 1, wherein (b) further comprises amplifying said video data.

5. The method of claim 4, wherein amplifying said video data further comprises processing said video data using video acceleration magnification or Eulerian video magnification.

6. The method of claim 1, wherein (b) further comprises processing said video data using a phase-based motion estimation algorithm or an object edge tracking algorithm.

7. The method of claim 1, wherein (b) further comprises selectively filtering one or more frequencies in said video data.

8. The method of claim 1, wherein (b) further comprises decomposing said video data into a plurality of different spatial or temporal scales and orientations, and processing each of said plurality of different spatial or temporal scales and orientations using a different computer vision or machine learning algorithm.

9. The method of claim 1, wherein (b) further comprises identifying a region of interest in said video data, and performing temporal analysis on said region of interest.

10. The method of claim 1, wherein said object comprises a physical dynamical system or a simulation of said physical dynamical system.

11. The method of claim 10, wherein said simulation of said physical dynamical system is generated using a generative adversarial network.

12. The method of claim 11, wherein said generative adversarial network comprises a generative network or a discriminative network.

13. The method of claim 10, wherein said control signal is configured to cause said physical dynamical system or said simulation of said physical dynamical system to perform an action.

14. The method of claim 10, wherein said control signal is configured to cause said physical dynamical system or said simulation of said physical dynamical system to shut down.

15. The method of claim 10, wherein said control signal is configured to cause said physical dynamical system or said simulation of said physical dynamical system to continue operation.

16. The method of claim 1, further comprising generating, in real-time, an alert or status indicator that indicates said predicted state of said object.

17. The method of claim 1, wherein said set of features comprises spatial or temporal features of said object.

18. The method of claim 17, wherein said spatial or temporal features comprise vibrations or movements of said object.

19. The method of claim 18, wherein said vibrations or movements are imperceptible to a naked eye.

20. The method of claim 17, wherein said spatial or temporal features comprise color changes of said object.

21. The method of claim 1, wherein said object comprises at least a component of a wind turbine, a nuclear reactor, a chemical reactor, a semiconductor fabrication system, an airfoil, a plasma system, a flame, a light source, a flow, an engine, a biological system, a medical imaging system, or a data source for a financial trading system.

22. The method of claim 1, wherein said AI algorithm comprises a deep neural network, a reservoir computing algorithm, a reinforcement learning algorithm, or a generative adversarial network.

23. The method of claim 1, further comprising storing or retrieving descriptors in a database.

24. The method of claim 1, wherein said AI algorithm is trained on historical training data.

25. The method of claim 24, wherein said historical training data comprises video data of said object or video data of objects of the same type as said object.

26. The method of claim 1, further comprising, prior to (b), obtaining data from non-camera sensors, and applying said AI algorithm to said data from said non-camera sensors to identify at least a portion of said set of features.

27. The method of claim 1, wherein said predicted state comprises one or more characteristics of the object.

28. The method of claim 27, wherein said characteristics indicate an anomaly.

29. The method of claim 28, wherein said anomaly is a defect, wherein said defect comprises a structural defect.

30. The method of claim 28, further comprising providing, via a user interface, a visual indication of a defect, a recommended action for said object based at least in part on said defect, or a combination thereof.

31. The method of claim 30, wherein said recommended action for said object comprises a redesign of said object.

32. The method of claim 1, further comprising, prior to (d), determining whether said predicted state of said object is suboptimal.

33. The method of claim 1, wherein said predicted state comprises one or more future states of said object.

34. The method of claim 1, wherein at least a portion of (a)-(e) is implemented on one or more computing devices.

35. The method of claim 1, wherein said AI algorithm is trained at least in part using a weighted mix of historical, offline training data and adaptive, online training data.

36. The method of claim 1, wherein (d) or (e) is performed using a second AI algorithm.

37. The method of claim 36, wherein said second AI algorithm is trained together, separately, or in an end-to-end fashion with said AI algorithm.

38. The method of claim 26, wherein said data from said non-camera sensors is used to validate said predicted state.

39. The method of claim 3, wherein adaptively adjusting said at least said portion of said AI algorithm comprises a supervised learning process, an unsupervised learning process, or a semi-supervised learning process.

40. The method of claim 1, wherein (c) is performed using at least one explainable artificial intelligence model.

* * * * *